Figure 1:
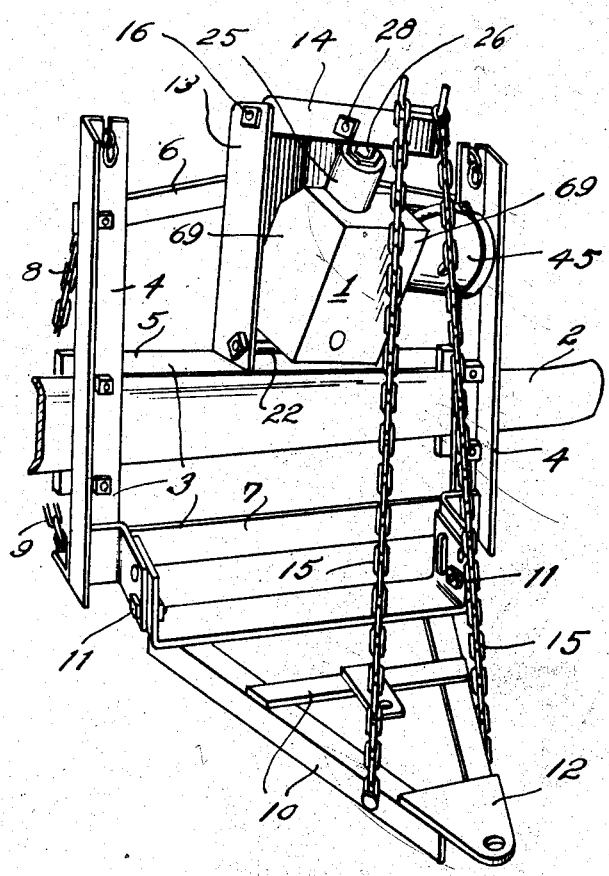

July 20, 1943.                E. B. MEYER                2,324,635
                        IMPLEMENT HANDLING MECHANISM
                Original Filed May 19, 1939      2 Sheets-Sheet 1

INVENTOR.
EDWARD B. MEYER
BY
ATT'Y.

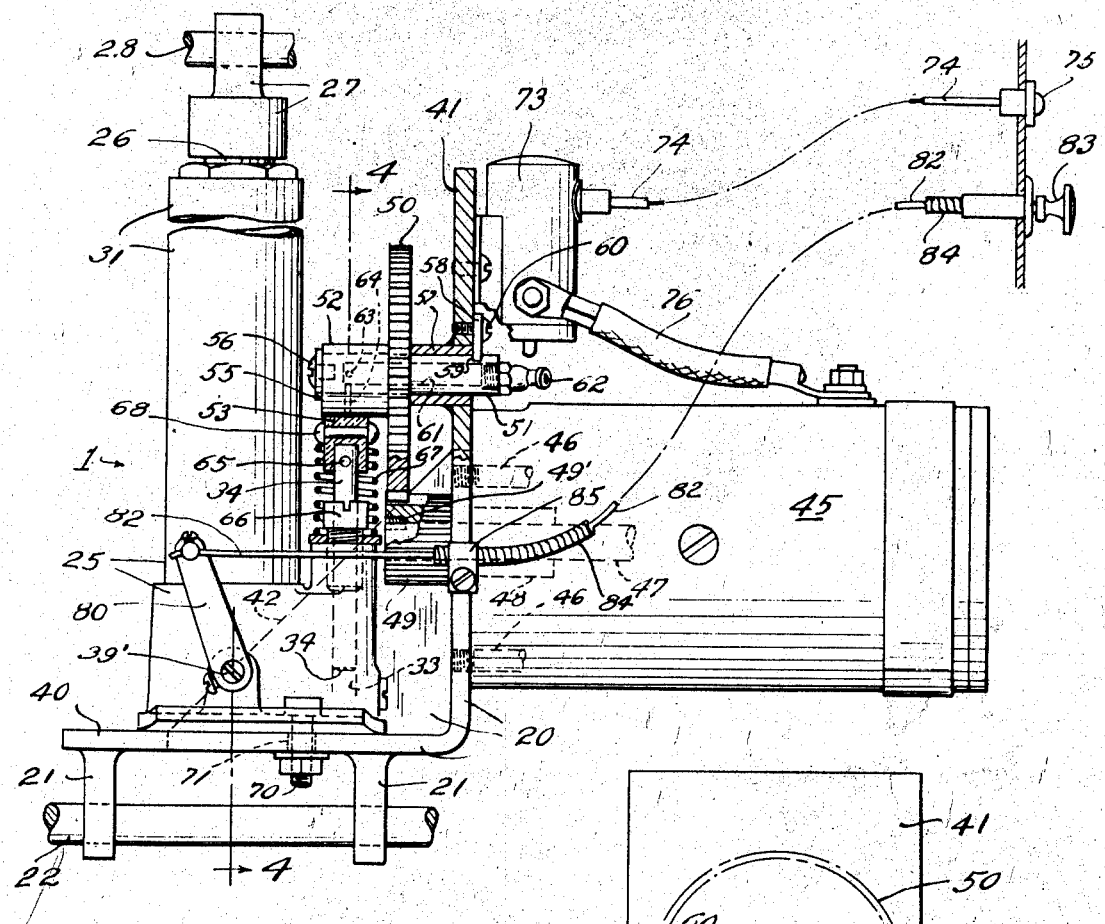
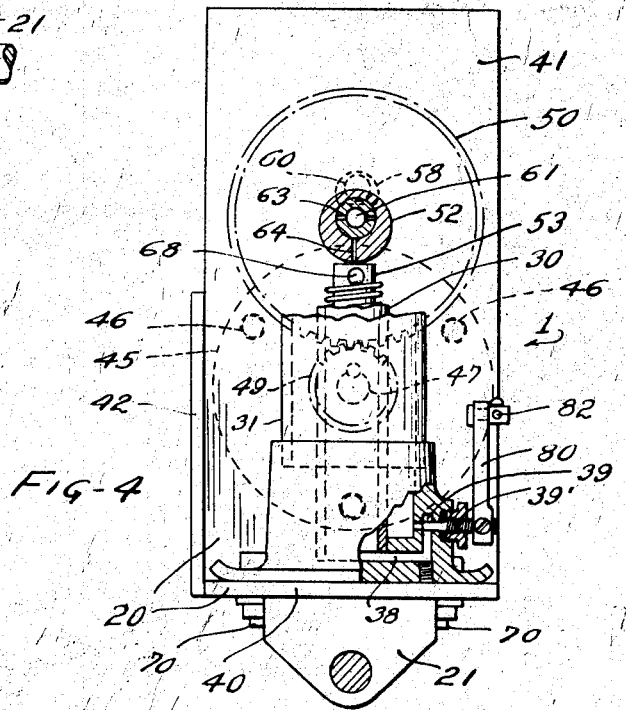

Patented July 20, 1943

2,324,635

UNITED STATES PATENT OFFICE 2,324,635

IMPLEMENT HANDLING MECHANISM

Edward B. Meyer, Cleveland, Ohio

Original application May 19, 1939, Serial No. 274,630. Divided and this application May 5, 1941, Serial No. 391,834

5 Claims. (Cl. 60—52)

The invention relates to a self-contained unitary lifting mechanism for implements such as track clearing plows, shovels, etc., which are adapted to be movably mounted for operation on internal combustion engine driven vehicles (i. e. automobiles and tractors) having electric power plants for starting, ignition, etc. The above indicates the principal object.

Another object is to provide a lifting mechanism unit which will enable efficient conjoint utilization of preexisting hydraulic and electrical equipment as a unitary lifting means for implements adapted to be mounted on such vehicles as mentioned above, and particularly conjoint utilization of a hydraulic jack and an electric motor designed to serve as a starter motor.

A further object is to provide a lifting unit comprising essentially a hydraulic jack and starter type motor, so arranged that the unit, without substantial alteration, can be mounted in place of conventional hydraulic lifting mechanisms previously provided for raising implements such as plows and shovels when mounted on automobiles and tractors and operated from the driver's position without requiring any hydraulic pressure system leading from such position to the lifting unit.

Figure 2:
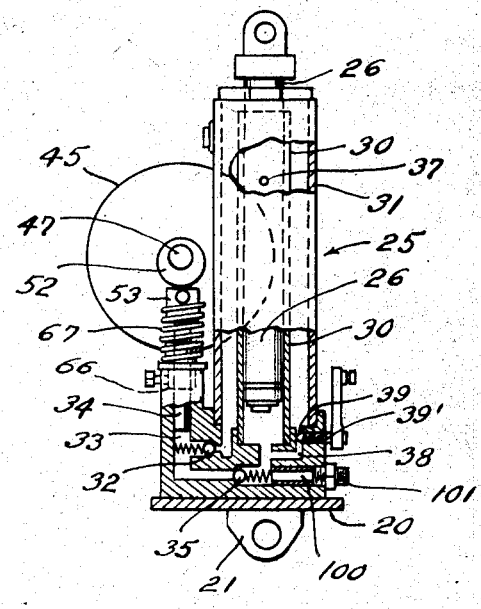
Figure 5:
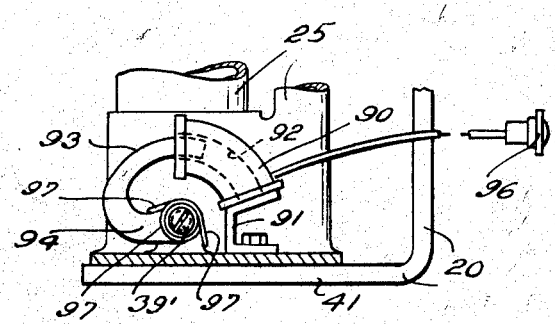

Other objects and novel features of the invention will become apparent from the following description of a preferred embodiment shown in the drawings, wherein:

Fig. 1 is a fragmentary perspective view illustrating one manner of applying the unit to a motor vehicle and implement supported for operation thereby; Fig. 2 is a diagram showing the operative relationship between the elements of the hydraulic jack; Fig. 3 is a sectional front elevation of the unit in one form; Fig. 4 is a fragmentary view of said unit (partly in section as indicated by the line 4—4 on Fig. 3), and Fig. 5 is a fragmentary view of a base portion of the hydraulic jack showing a modified means for controlling a release valve thereof.

The present unit was developed to fill a long felt need in a large field of application thereof, namely the lifting of pusher-type snow plows and shovels adapted to be demountably attached to automobiles and tractors. Such implements usually have sufficient weight so that they will operate properly if lowered from carrying position into operating position. Mechanical and purely hydraulic lifting arrangements were the only means available for enabling the lifting to be actuated from driver's position. The mechanical arrangements were difficult to apply in many cases; not very efficient or convenient and interfered with proper attention to driving of the vehicle. The hydraulic arrangements also required too much attention on part of the driver and invariably required tubing leading from the driver's position to the hydraulic ram. The tubing was subject to leakage and installation difficulties, for instance required considerable skill so to install it that the system would be free from air. The present unit met the need for an improved lifting means, principally because it could be amply powered from supply already existing on motor driven vehicles; could be applied to most equipment already in use without change thereof; needed no plumbing (tubes and joints subject to leakage etc.), and eliminated the dangers previously existing by virtue of the fact that the lifting and lowering operations diverted the operator's attention from proper driving control of the vehicle. The control for lifting and lowering of the implement by the driver became (with the present unit) merely a matter of manipulating buttons conveniently located within easy reach as on or adjacent the usual instrument board and requiring almost insignificant strength to operate them.

Referring further to the drawings, Fig. 1 shows one position in which the unit hereof may be mounted for operation to lift an implement secured at the front of a motor vehicle, the lifting unit being indicated generally at 1. 2 represents a bumper of an automobile truck on which a rigid supporting frame 3 including uprights 4 and cross members 5, 6 and 7 may be supported, at least in part. Additional connections between the frame 3 and the vehicle may include chains 8 and 9 leading to the usual bumper arms (not shown) or to the vehicle chassis. The implement is represented only by an A-frame 10 adjustably pivoted as on bolts 11 to the frame 3. The A-frame is of conventional construction and adapted pivotally to support, for instance, a plow or shovel at a forward plate 12 which is apertured to receive a coupling pin. Such implement would usually be additionally secured to the A-frame to enable angular adjustment with respect to the path of movement of the vehicle or for other purposes. The implement may be such as shown in my prior Patents 1,925,395 or 2,061,585. The A-frame is shown in lowered position, as when the plow or shovel is in operative relation to or in contact with a track to be cleared of snow.

To enable the unit 1 to swing the A-frame and thereby lift the implement carried thereon, a rigid support 13 is built into the frame 3 as over the cross member 5. The support pivotally carries an arm 14 extending forwardly over the A-frame and attached to the latter as by chains 15, in a manner obvious from Fig. 1. The pivot of the arm 14 on the frame member 13 is indicated at 16. The main frame or body member of the unit 1 (member 20 Fig. 3) has a bracket or pair of brackets 21 depending therefrom for pivotal attachment to the frame member 13 as on a horizontal pin or bar 22 located above the cross frame member 5. The hydraulic jack assembly, 25 as a whole, has its lift rod or ram member 26 provided with a head 27 apertured to receive a horizontal pivot pin 28 on the lift arm 14. In practice the arm 14 may be an inverted channel, so that the apertured portion of the head 27 extends between the channel flanges, which latter carry the pivot pin 28.

The operating elements of the hydraulic jack 25 are as indicated diagrammatically in Fig. 2. A ram cylinder 30 slidably carries the rod or ram 26 and is surrounded by a casing 31 which constitutes a generally closed reservoir for hydraulic fluid. Fluid is drawn from the reservoir past a check valve 32 into a pump chamber 33 having a vertical pump plunger 34 fitted thereto; and the plunger is adapted to be reciprocated to force the fluid past a check valve 35 into the cylinder 30 below the rod or ram 26 to raise the latter. The raising movement is limited by a by-pass 37 between the effective ends of the cylinder bore and communicating said bore with the reservoir. When the rod 26 has been raised to such elevation that its lower end unseals the by-pass 37, further pumping merely circulates fluid idly through the by-pass.

The rod or ram 26 is lowered by releasing fluid from the cylinder bore through a passage 38 past a pressure release valve 39 into the reservoir. The rate of lowering movement is governed by the amount the release valve is opened. Opening and closing of the valve is accomplished by turning of the threaded screw 39' which constitutes the release valve plug. This screw, in commercial hydraulic jacks, is usually placed, as indicated on Fig. 3, at right angles to the position of the pump cylinder and plunger 33, 34 about the axis of the main cylinder 30, which position lends itself to convenient control of the screw, but requiring modification of the usual arrangement as described below.

The frame 20 is an angle section providing a base 40 upon which to support the hydraulic jack and the pivot bracket or brackets 21, and an upright support 41 upon which to support the motor 45 (and gearing if reduction gearing is employed). The upright support and base are interconnected and mutually braced by a gusset plate 42. By the arrangement shown, the motor 45 can be carried on the upright portion 41 in a position with its operating axis parallel to the pivots 22 and 28, so that the motor is out of the way of the various supports and connections previously described and fully accessible for making the necessary electrical connections therewith or for adjustment and servicing of the motor.

The motor 45 is a conventional starter motor provided with the usual means (e. g. studs or bolts 46 Fig. 3) for fastening it with one end face against a support such as constituted by the upright portion 41 of the frame 20. In such position the armature shaft may be connected with the pump plunger 34 of the hydraulic jack directly or through suitable gearing. As shown in Figs. 3 and 4 gearing is employed.

Referring particularly to Figs. 3 and 4, the armature shaft 47 of the motor, supported on bearings in the motor case one of which is indicated at 48, extends through the upright portion 41 of the unit frame and may carry a pinion 49 attached to the shaft as by a screw 49'. The pinion drives a gear 50 on a fixed, non-rotary stub shaft 51, the outer end of which overhangs the pump plunger 34. The gear has a circular eccentric element 52 thereon, rigid therewith, which rides continuously on a non-metallic head portion 53 of the plunger to reciprocate the latter as the gear is turned. The combined gear and eccentric can be secured to the fixed shaft 51 by a washer 55 and screw 56, the latter entering the shaft. The shaft, as shown, is supported by a sleeve 57 inserted into an aperture in the upright member 41 and welded in place, and the shaft is held in position against endwise movement toward the hydraulic jack by a key disc 58 having a non-circular edge portion seated in a slot 59 of the shaft 51 and secured against the upright portion 41 of the frame as by a screw 60 entering said frame portion.

The bearing afforded by the fixed shaft 51 for the combined gear and eccentric, and also the contacting faces of the eccentric and head 53 of the plunger, may be lubricated by a supply of oil contained in a central bore 61 of the shaft 51 and introduced thereto through a conventional nipple 62. Lubricant (as indicated by Fig. 4) passes from the reservoir to the bearing surfaces through lateral holes 63 in the fixed shaft and thence to the external surface of the eccentric through a hole 64 in the eccentric.

The non-metallic head 53 of the pump plunger 34 comprises tough material such as hard fiber stock, with or without reinforcing material embedded therein, (e. g. brake block material), said head having a smooth continuous upper face for contact with the eccentric. The head is bored to receive the upper end of the plunger and may be pinned thereto as at 65. The plunger extends upwardly through a threaded packing sleeve 66, as usual, and is forced upwardly after each pumping stroke, by a coil spring 67 surrounding the protruding portion of the packing sleeve and bearing upwardly against a shoulder on the non-metallic head 53. The shoulder may be formed by heads of a rivet 68 carried by the non-metallic head as clearly illustrated in Fig. 3.

When no reduction gearing is required, the motor is mounted in the position occupied by the non-rotary shaft 51, and the driving eccentric is suitably fastened directly to the armature shaft of the motor. In that event only the exterior surface of the eccentric requires lubrication (occasional) as through a suitable opening in the top wall of a cover 69 which may surround the hydraulic jack as indicated in Fig. 1.

By virtue of the metal-to-fiber contact between the rotary driving element and the pump plunger as much as a one-half inch stroke may be given the plunger without exertion of sufficient lateral thrust on the plunger to cause wear on the plunger cylinder wall (or gland sleeve 66). Even if the operator neglects to lubricate the contacting surfaces of the eccentric and plunger head for long periods of time no damage to the mechanism will ordinarily result, nor will there be sufficient friction between the eccentric and head 53 to cause the motor to labor heavily in lifting implements of average weight and as ordinarily mounted on the supporting vehicles.

A special advantage of the driving connection herein shown between the motor and hydraulic jack plunger (the eccentric bearing on the plunger head) is that the hydraulic jack does not have to be accurately oriented with reference to the motor shaft. Thus the jack base can be bolted to the base portion 40 of the frame 20 as by bolts 70 (Figs. 3 and 4) inserted into fairly large openings 71 in the portion 40 and then clamped securely by suitable nuts, without danger of causing improper or inefficient operation. One only needs to make certain that the fixed axis of the rotary driving element is approximately over the axis of the jack pump plunger in order to insure that the unit will operate satisfactorily.

Instantaneous control of the motor can be readily accomplished by providing a starter type switch, such as shown at 73 for the motor and an electric conductor wire 74 leading therefrom to a push button switch 75 at the driver's station, as on the instrument board of the vehicle. The switch 73 is magnetically operated when the button 75 is pressed, thereby causing current to pass through the motor, a ground conductor cable 76 being connected to the switch 73 and the motor.

Equally readily controllable and similarly positioned means for operating the release valve screw 39' may comprise an arm 80 on the release valve screw connected as by a Bowden wire 82 to a conventional push and pull button or knob 83 at the driver's station. The usual flexible sheath 84 for such Bowden wire control is shown as fastened at one end to the upright portion 41 of the frame 20 by a clip 85.

Ordinarily the release valve of a hydraulic jack has right hand threads so that (as viewed in Fig. 3) a right hand or clockwise turn of the screw 39' would close the release valve 39. As shown by Fig. 4 a left hand threaded screw is employed when the screw location is as illustrated, so that the Bowden wire is pulled by the operator to release the valve and pushed to close it. If the Bowden wire were pulled to close the valve then, frequently, the wire would have insufficient rigidity, where unsupported by the sheath 84, to effect release of the valve; and, moreover, such arrangement would require that the button 83 normally occupy a pulled-out rather than a pushed-in position.

Referring further to the diagram, Fig. 2, the passage 100 and fitting 101 therein enables the power plunger of the hydraulic jack 25 to be operated hydraulically by a suitable pump (not shown) located remotely of the present unit and adapted to be connected thereto through suitable (e. g. flexible) tubing. The fitting 101 is a connecter for such tube by which hydraulic fluid may be supplied to the power cylinder of the hydraulic jack 25 in event the power of the motor, as by reason of abnormally discharged condition of the vehicle battery, is insufficient to raise the load to be lifted (e. g. implement on the A-frame). When such auxiliary or boosting power is not required then the passage 100 is simply closed by a screw plug, replacing fitting 101.

With the mechanical advantage afforded by the hydraulic jack, an ordinary starter motor has ample power to lift implements of such weight as can be effectively mounted on and operated by light auto trucks and tractors, even without any reduction gearing. The gearing is used when heavier loads have to be lifted. Lifting to average carrying position requires only a few seconds, and never any more drain on the battery than can be compensated for by increasing the charging rate of the generator.

Fig. 5 shows an electrically controllable actuating arrangement for the release valve screw 39'. This comprises a solenoid 90 mounted as on a bracket 91 of the frame 20. The core receiving space 92 of the solenoid winding can be curved concentrically with the valve screw 39' and an armature or core can be formed by a similarly curved extension 93 of an arm 94 which is attached to the valve screw. Pressure on a switch button 96 located as in the cab of the vehicle can energize the solenoid magnet by car battery power to open the release valve 39', and the arm 94 returned to valve closing position by a torsion or other suitable spring. As shown, a coil spring 97 surrounds the outwardly projecting end of the screw and has bent end portions appropriately bearing on the arm 94 and a portion of the jack base, respectively, for turning the screw counterclockwise to release-valve-closing position. The specific arrangement shown would also have a left hand threaded valve screw.

It will be seen that the power lift is simple, rapid and flexible in operation and relatively inexpensive to manufacture, install and operate. Raising and lowering of heavy tools at any time, as in order to clear curbing and other obstructions without having to stop the vehicle or even slow down appreciably, can be done much more quickly than by the methods previously used. Since the motor can be started and stopped instantly at the will of the operator and the operating fluid automatically checked, and is releasable at will, the driver can manipulate the implement with practically no physical exertion and give almost full attention to the matter of safe driving of the vehicle at all times.

This application is division of my application Serial No. 274,630 filed May 19, 1939, which latter is a continuation in part of my prior application Serial No. 231,193, filed September 22, 1938, both now abandoned.

I claim:

1. A lifting unit for an implement adapted to be mounted on a motor vehicle; said unit comprising a rigid frame having a base portion and an upright portion, a self-contained hydraulic jack on the base portion and having a power cylinder and plunger extending adjacent the upright portion, means on the base portion of the frame and on the power plunger respectively for pivotally attaching the frame and plunger one to such vehicle and the other to such implement, said jack including a pump plunger for raising the jack, an electric motor on the upright portion operatively connected to the pump plunger in a manner to cause raising of the power plunger, means for securing the jack to the frame so as to adjustably position the pump plunger with respect to the motor, release valve means on the jack to enable lowering of the power plunger, and separate means connected with the motor and with the release valve means respectively and operable to control the motor and the release valve means respectively from points remote from the unit.

2. A lifting unit for lifting a load structure relative to a supporting structure, said unit comprising a rigid frame adapted for attachment to one of said structures, a self-contained hydraulic jack having a power cylinder and power plunger the latter being adapted for attachment to the other structure, said jack having a pump plunger with a head portion extending therefrom to enable hydraulic fluid to be forced to the power cylinder upon reciprocation of the plunger, an electric motor on the frame having a driving element extending at right angles to the axis of the pump plunger, an eccentric on the driving element and bearing against the head portion of the plunger, spring means on the plunger adapted and arranged to force the head portion of the pump plunger against the eccentric, and means for detachably securing the jack to the frame in such position that the axis of the pump plunger is located approximately in line with the axis of the driving element of the motor.

3. A power lift unit for the purpose described, said unit comprising a frame having means enabling it to be pivotally connected to a supporting structure, a self-contained hydraulic jack unit mounted on the frame and having a pump, a reservoir, a working cylinder and power plunger therein, said power plunger having means thereon for enabling the same to be pivotally connected to a work member to be raised relative to the supporting structure, an electric motor rigidly mounted on the frame and operatively connected to the pump, means for adjustably securing the jack unit to the frame so as to adjustably position the pump with respect to the motor, means adapted and arranged to energize the motor from a point remotely of the unit for raising the power plunger, a release valve for the working cylinder operable to block and unblock passage of hydraulic fluid from the cylinder to the reservoir, and means connected with the valve and extending remotely of the unit for enabling operation of the valve to permit the power plunger to be lowered by the weight of the work member.

4. A power lift unit for the purpose described, said unit comprising a rigid frame having an upright portion and a horizontal portion, a self-contained hydraulic jack supported on the horizontal portion and having a power cylinder and power plunger extending substantially parallel to the upright frame portion, said jack having a pump, a self-contained electric motor having a casing and an armature shaft supported in the casing and projecting from one end thereof, means securing said end of the casing to the upright frame portion on the side thereof opposite the position occupied by the jack, said armature shaft projecting beyond the upright portion in a direction away from said motor casing and operatively connected to the pump to cause it to deliver hydraulic fluid to the power cylinder as the armature shaft is turned, means for controlling the motor and means for releasing hydraulic fluid from the working cylinder of the jack, each of said means being operable from a point remotely of the unit, means on the horizontal portion of the frame providing a pivotal mounting for the frame on a pivotal axis extending parallel to the armature shaft of the motor for mounting the unit on a supporting structure, and means on the power plunger of the jack for connecting the same to a load to be lifted relative to the supporting structure.

5. A power lift unit for the purpose described, said unit comprising a rigid frame having an upright portion and a horizontal portion, a self-contained hydraulic jack supported on the horizontal portion and having a power cylinder and lifting plunger extending substantially parallel to the upright frame portion, said jack having a reciprocable pump plunger with its axis extending parallel to the upright frame portion and adjacent thereto, a self-contained electric motor having a casing and an armature shaft supported in the casing and projecting from one end thereof, means securing said end of the casing to the upright frame portion on the side thereof opposite the position occupied by the jack, said armature shaft projecting beyond the upright portion in a direction away from said motor casing and operatively connected to the pump plunger to reciprocate it as the armature shaft is turned, means for controlling the motor and means for releasing hydraulic fluid from the working cylinder of the jack, each of said means being operable from a point remotely of the unit, means on the horizontal portion of the frame providing a pivotal mounting for the frame on a pivotal axis extending parallel to the armature shaft of the motor for mounting the unit on a supporting structure, and means on the power plunger of the jack for connecting the same to a load to be lifted relative to the supporting structure.

EDWARD B. MEYER.